United States Patent [19]
Bechtold et al.

[11] Patent Number: 4,666,800
[45] Date of Patent: May 19, 1987

[54] COVER FOR A BATTERY CELL

[75] Inventors: Dieter Bechtold, Frankfurt; Rudolf Eckardt, Steinbach, both of Fed. Rep. of Germany

[73] Assignee: Varta Batterie Aktiengesellschaft, Hanover, Fed. Rep. of Germany

[21] Appl. No.: 771,970

[22] Filed: Sep. 3, 1985

[30] Foreign Application Priority Data

Sep. 22, 1984 [DE] Fed. Rep. of Germany ....... 3434902

[51] Int. Cl.⁴ .............................................. H01M 2/08
[52] U.S. Cl. ..................................... 429/175; 429/176
[58] Field of Search ................................ 429/175, 176

[56] References Cited

U.S. PATENT DOCUMENTS 4,276,360  6/1981  Hardigg et al. ..................... 429/175
4,380,577  4/1983  Hardigg ............................. 429/175

Primary Examiner—Brian E. Hearn
Assistant Examiner—Stephen J. Kalafut
Attorney, Agent, or Firm—Weiser & Stapler

[57] ABSTRACT

A cover which is to be sealed tightly to the corresponding plastic container of a battery cell by means of radiant heating is provided with a series of molded knobs along the lower side of its edge, which knobs serve as spacers between the cover and the edge of the container during the heat-up phase so that the surfaces to be bonded are exposed to the radiant heat without obstruction. The softened knobs are plasticized and bonded when the container and the cover are subsequently pressed together.

7 Claims, 2 Drawing Figures

COVER FOR A BATTERY CELL

BACKGROUND OF THE INVENTION

The present invention relates generally to a cover for enclosing a battery cell container made from a thermoplastic material, and in particular, to a cover which is capable of being bonded to the horizontal top edge of the container by radiant heating.

Ultrasonic sealing and butt-sealing with heat reflectors are the principal means used to mutually seal cell covers and cell containers apart from the more traditional gluing methods. However, the heat required to melt the edges of the cover and the container can also be applied to the surfaces to be joined as radiant heat, for example, by means of a hot wire. In all cases, a complete and reliable seal of the cell container, one which can also withstand extreme temperature variations and vibrations, is the desirable goal.

Container structures with meshing tongues and recesses are less favorable for ultrasonic bonding, because such structures tend to reduce the penetration of the ultrasound. In the case of butt-sealing with heat reflectors, the heat reflector must be precisely adapted to the contour of the edges of the container to which the cover is to be bonded, and must at least have openings for the cell poles which are to project from the inside of the container, above the plane of sealing.

In a battery container/cover sealing system according to EP No. 28 116, which is based on the principle of butt-sealing with heat reflectors, an otherwise one-piece heat reflector is subdivided into four heating elements which are moved from opposing positions to the long and broad sides of the container so as to form a heating ring only in a working position in which the front edges of the heating elements reach between the edge of the container and the edge of the cover. A narrow vertical gap into which fused material can escape from the actual horizontal sealing zone, so as to form an additional sealing zone, is developed between a skirt depending from the cover and the inner edge of the container by providing the underside of the cover with guide pins for proper positioning of the cover with respect to the container. To this end, the skirt connects the pins with one another, while being recessed somewhat behind the plane of the pins. However, in automating this method of assembly, extraordinary machinery and control systems are required. Moreover, such a method of assembly is only suitable for thick-walled containers.

Thus, it is the primary object of the present invention to provide a cover which is designed for use in the thermal bonding of covers to thin-walled containers by means of less expensive hot wires or heater bands, yet which is favorable to the efficiency of the bonding and the resulting tightness of the bond.

SUMMARY OF THE INVENTION

This and other objects are achieved according to the present invention by providing a cover for enclosing a battery container made from a thermoplastic material with a series of knobs extending from the lower side edge of the cover so as to contact the top edge of the container, which knobs are adapted to space the lower edge of the cover from the top edge of the container during the heat-up phase of radiant heat bonding. Such knobs serve to space these edges from one another during heat-up of the elements being bonded, and to contribute to the bond which is subsequently produced.

Further detail regarding a preferred embodiment cover in accordance with the present invention may be had with reference to the description which follows, taken in conjunction with the following illustrations.

DETAILED DESCRIPTION OF A PREFERRED EMBODIMENT

Figure 1:
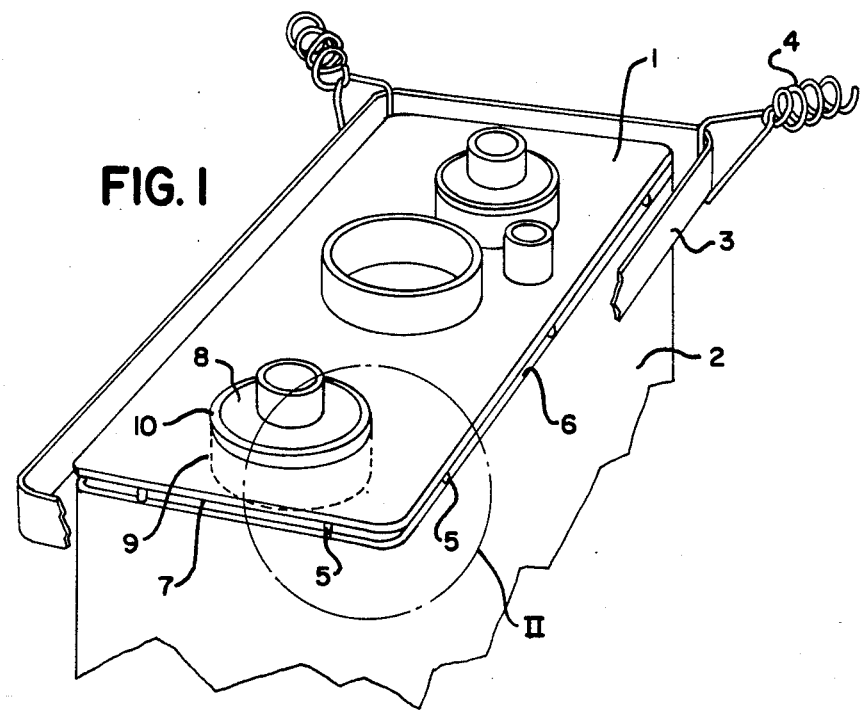
FIG. 1 is a fragmented isometric view of a cover according to the present invention together with a corresponding container, as positioned for bonding.

FIG. 1 illustrates a cover 1 and a container 2, made from the same thermoplastic material, which are about to be joined together by means of radiant heating. To this end, a hot wire or heater band 3 surrounds the bonding zone. The heater band 3 is uniformly spaced from the cover 1 and the container 2 within the bonding zone, and is suspended on electrically-insulated and heat-insulated spring members 4 so that any thermal expansion can be uniformly distributed over the various sections of the heater band 3, or can be compensated by the action of the spring members 4. As a result, it is possible to maintain substantially constant distances from the workpieces, especially during the heat-up period.

It is absolutely necessary to the continuous bonding of the cover and container that the softening of the components to be bonded also involve the inner surfaces of the elements being joined. This is achieved according to the present invention by providing the lower side of the edge of the cover 1 with a series of knobs 5, preferably during injection molding of the cover 1, which are distributed over the circumference of the cover 1 so as to initially provide a space between the cover 1 and the top edge 6 of the container 2 when the cover is placed over the container. Proper positioning of the cover during assembly is assured by a skirt 7 which extendings fully around the lower side of the cover 1, and as a result of the battery poles 8 being introduced into corresponding tubes 9 recessed in the cover 1, particularly in view of the frictional contact which is developed between the tubes 9 in the cover 1 and the plastic injection molding 10 which conventionally surrounds the poles 8.

As a result, the knobs 5 are caused to stand on the top edge 6 of the container 2, acting as spacers between the container 2 and the cover 1 which, during heat-up of the heater band 3, enables heat to penetrate between the parts to be joined. After the surfaces to be bonded have become soft, including the knobs 5, the container 2 and the cover 1 are pressed against each other. The knobs 5 then become plasticized and bonded.

The number and height of the knobs 5 is selected so as to assure that the gap developed between the cover 1 and the container 2 is uniformly stable during the heating of all points along the bond to be prepared. If encountered, slight warpage of the cover 1 is compensated by the snug fit of the tubes 9 of the cover 1 over the pole jackets 10, in combination with the stops created by the knobs 5.

Figure 1A:
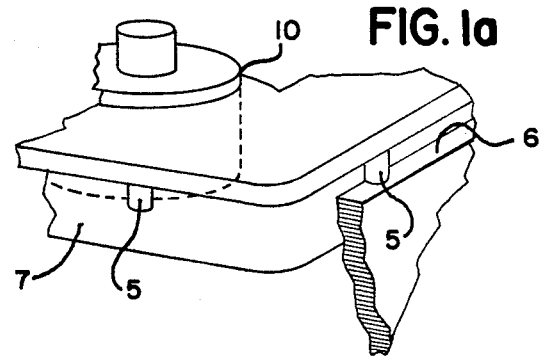
FIG. 1a is a partial, sectioned isometric view illustrating the structure shown at II in FIG. 1 in greater detail.

FIG. 1a is an enlarged view which clearly shows the skirt 7 which serves to precisely position the cover 1 over the edge 6 of the container 2. This skirt 7 is directly reached by the radiant heat developed in the plane of the knobs 5. As a result, the skirt 7, along with the edge 6 of the container 2 and the lower edge of the cover 1, is bonded at least in this zone. The skirt 7 also serves as a support during pressing together of the cover 1 and the container 2 after the surfaces involved have been appropriately softened.

If the cover 1 were flush with the container 2 during the heating phase, only a film-like bonding would be created between the contacting surfaces. Although this bond would initially also be tight, it would very easily become loose under mechanical stress. In contrast, a bond produced according to the present invention guarantees a high degree of stability across the entire wall of the container as a result of the continuous bonding of the materials involved.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In a cover for enclosing a battery container made from a thermoplastic material, said cover having a lower marginal edge for mating with the top edge of the container and capable of being heated by radiant heat and bonded to the mating edge of the container, the improvement wherein a plurality of molded knobs extend from the lower marginal edge of the cover and are adapted for placement over the mating edge of the container during the heat-up phase of said radiant heating, to space the lower marginal edge of the cover from the mating edge of the container, and for thereafter bonding the cover to the container.

2. The cover of claim 1 wherein the knobs are uniformly distributed around the lower marginal edge of the cover.

3. The cover of claim 1 wherein the knobs are injection molded as part of the cover.

4. The cover of claim 1 wherein the knobs uniformly space the cover from the container.

5. In a cover for enclosing a battery container made from a thermoplastic material, the improvement wherein a plurality of knobs extend from lower marginal edge portions of the cover for mating with the top edge of the container, so as to contact the mating edge of the container and space the cover from the container prior to bonding.

6. The cover of claim 5 wherein the top edge of said container is an upper edge separating the inner and outer side walls of said container.

7. In a cover for enclosing a battery container made from a thermoplastic material, said cover having a lower marginal edge for mating with the top edge of the container and capable of being heated by radiant heat and bonded to the mating edge which separates the inner and outer side walls of the container, the improvement wherein a plurality of molded knobs extend from the lower marginal edge of the cover for placement onto the mating edge of the container during the heat-up phase of said radiant heating, to space the lower marginal edge of the cover from the mating edge of the container, and for thereafter bonding the cover to the container.

* * * * *